Aug. 4, 1970  J. P. GABRIET  3,522,993
STABILIZING DEVICE FOR LIGHT BEAM IN OPTICAL SIMULATORS
Filed March 22, 1967
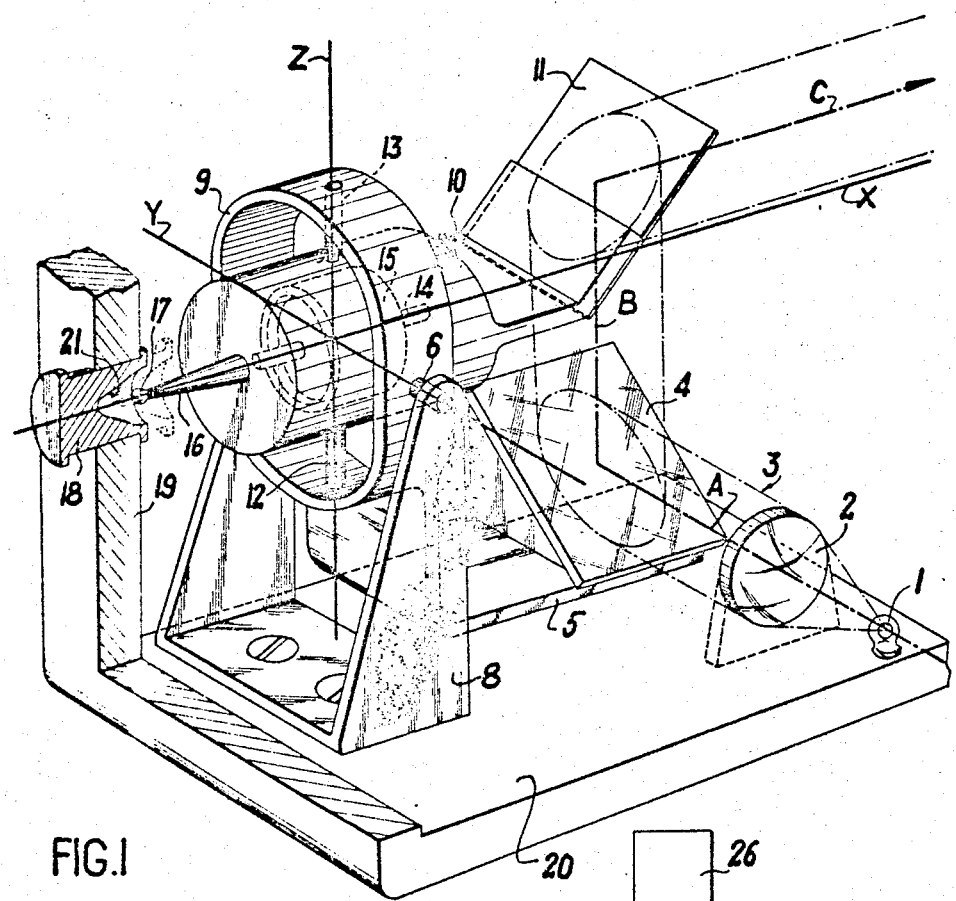
FIG.1
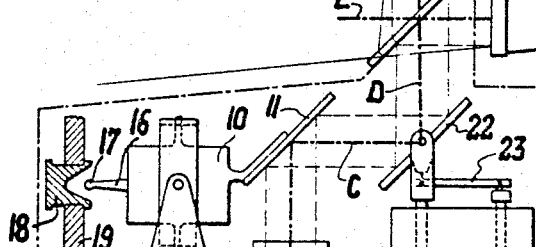
FIG.2
FIG.3

United States Patent Office
3,522,993
Patented Aug. 4, 1970

3,522,993
STABILIZING DEVICE FOR LIGHT BEAM IN OPTICAL SIMULATORS
Jean Paul Gabriet, Boulogne-Billancourt, France, assignor to Giravions Dorand, Suresnes, Hauts-de-Seine, France
Filed Mar. 22, 1967, Ser. No. 625,223
Claims priority, application France, June 17, 1966, 65,862
Int. Cl. G01c 9/02, 9/12, 9/16
U.S. Cl. 356—248                     2 Claims

ABSTRACT OF THE DISCLOSURE

A device for stabilizing a beam of light projected in a predetermined direction onto an optical system of a firing trainer for guided missiles for producing in the optical system a controllable light spot simulating the path of the guided missile in which the beam issuing from a source is oriented initially perpendicularly to a predetermined direction and reflected both perpendicularly to the initial orientation and to the predetermined direction and finally reflected into an orientation parallel to the predetermined direction while maintaining the angles of reflection constant and gyroscopically stabilizing the final orientation.

BACKGROUND OF THE INVENTION

The present invention relates to a method of and device for holding an optical beam parallel to a predetermined direction independently of possible movements of the support carrying the source emitting such a beam.

The present invention also relates to appliances or instruments for firing-training with guided missiles incorporating an optical simulator of the path of the missile, and more particularly for use in and on moving vehicles, and embodying the device.

Among the practical applications of such a device one of the most important is that for firing-training with guided missiles. The device can, however, also be advantageously used to stabilize the projection of images on a fixed screen from a projector resting on an unstable base; or also, for holding the beam of a mobile projector aimed at a fixed or stationary objective.

Guided missiles are comparatively expensive weapons and firing-training with them is generally conducted by means of firing simulators such as that known under the trade name of "Exosimulator" which allows of simulated firing both at fixed and moving, real targets. Training can be conducted either on the terrain or in a command post, aiming being further performed both with the naked eye and with the aid of optical aiming devices and magnifying instruments such as used in actual firing. Such appliances as a rule incorporate a semireflecting mirror, operating on the principle of the camera lucida, allowing the marksman to observe the target to be aimed at in real landscape simultaneously with a luminous point or light spot simulating the trace of a missile and guidable in the same manner as the actual missile. The target and the spot are observed, one by transparence through the mirror, and the other by reflection therefrom. Guiding can be performed by manual control or at least partially by automatic means, with angular displacement of the spot similarly to the reactions of a real missile.

If the optical system of the simulator is mounted on a mobile carriage, a ground vehicle, water craft or aircraft in motion, it is necessary to apply a stabilizing correction to the motions of the light spot, since the landscape, and even the missile, as soon as it has left the launcher, should not be exposed to angular displacements of the optical system of the simulator.

Various methods have been suggested for applying this correction, which is intended to cancel the effect of displacements of the light spot due to angular motions of the simulator. One of the most common consists of a gyroscope with a conventional suspension, having two degrees of freedom, the axis of the rotor thereof being held stationary in space without appreciable precession, in spite of the angular displacements of the support during a period of time at least compatible with the duration of the shot.

The marksman directs the axis of the gyroscope into the line of fire, and releases it at the instant of firing. The gyroscope then maintains this direction, independently of the movements of its mounting; thus, the apparent angular displacements of the gyroscope, with reference to the optical assembly, embody the stabilizing corrections to be applied to the direction of the light spot.

Such a spot is generally produced by a collimated, pseudo-parallel light beam, supplied by a practically point source of light placed in the focus of a converging lens or concave mirror. Intercepted by the eye, even partially, such a beam appears to the marksman as the image of a luminous point projected practically to infinity in a direction parallel to the beam. The motions of the light spot result from the deviation of the collimated beam, either directly by a deflecting mirror, or indirectly by the real or virtual displacement of some other element of the optical system.

In order to apply to the beam a stabilizing correction as above, recourse is generally had to a deflecting mirror, linked with the free system of the gyroscope, carrying the rotor. However, the deflections of a reflected beam being double those of a deflecting mirror, it has hitherto been necessary to have recourse to some optical devices of a fairly complicated kind for, even approximately, reducing the deviation to the required value.

The present invention makes it possible to mitigate these inconveniences and to directly obtain an original arrangement enabling the stabilizing correction for such a collimated light beam.

SUMMARY OF THE INVENTION

An object of the present invention is to provide a method of and device for maintaining an optical beam parallel with a predetermined direction independently of movements imparted to the mounting of the source of such light beam, which consists in orientating the beam issuing from such source, initially, perpendicularly to the predetermined direction, reflecting it both perpendicularly to such initial orientation and to the aforesaid predetermined direction and reflecting it finally into an orientation parallel with the aforesaid predetermined direction, while maintaining the angles of reflection constant, and gyroscopically stabilizing the final orientation.

One form of embodiment of this method and device consists in reflecting the light beam issuing from the luminous source successively on to two reflectors respectively linked with two mobile mountings forming a gimbal suspension for one of the reflectors on the mounting and stabilizing the reflector by linkage with the stator of a gyroscope with its axis parallel to the aforesaid predetermined direction.

The invention likewise includes a stabilized optical system emitting a light beam always orientated parallel to a predetermined direction, whatever the movements of the support of mounting, of the device according to the aforesaid method. Such an arrangement comprises a gyroscope with its axis capable of being orientated in the predetermined direction, with means for rotating the same, and firmly seated thereon, in a first mobile, balanced mounting carrying a primary optical reflector, swinging freely about a first axis perpendicular to the gyroscope axis, and pivoting on a second mobile mounting, fully-balanced and carrying a second optical reflector, swinging freely about a second axis perpendicular to the first axis, in the same plane as the gyroscope axis, and which pivots on the support mounting. This assembly forms a cardan suspension, in labile equilibrium, of the gyroscope on the support mounting, with episcopally-arranged first and second reflectors. The assembly further comprises a light source fixed on the support, emitting a light beam directed parallel to the aforesaid second axis, in the direction of the second reflector, which reflects the beam parallel to the first aforesaid axis, in the direction of the first reflector, and reflecting the beam parallel to the gyroscope axis. The arrangement further comprises means releasable at will, for orientating the first mounting in a predetermined direction.

Releasable adjusting means can further be provided for the initial orientation of the first, mobile mounting in the predetermined direction, while orientation means consisting of a pin and a conical centering pivot, one of the elements of which is fixed on the first mobile mounting, and the other is a manual control element releasable at will, enables the orientation of the first mobile mounting in the predetermined direction, and subsequently releasing it.

The light beam emitted by the source, may be passed through a collimator fixed on the support of the light source, before reflection by the second reflector.

The invention further comprises firing-training means for guided missiles with optical simulation of the path of such a missile, incorporating an arrangement or applying a method, such as described above.

In such instruments, the fire-control means may consist of not less than one device for spotting and observing simultaneously the target aimed at and a luminous point simulating the path of the missile by means of a stabilized, optical system.

A set of mirrors arranged in an episcope system may comprise a semireflecting mirror arranged in the field of view of the marksman to enable at least the simultaneous observation, by transparency and reflection, of the target aimed at and the light spot simulating the trace or path of the missile.

Means for aiming the firing can allow the gyroscope-stabilized optical system to be orientated in the aiming direction and the launching means for the missile can be arranged to release the system according to the present invention, at the instance of the simulated discharge or launch of the missile.

The accompanying drawings represent an embodiment of an optical device according to the invention, as well as a firing simulator incorporating such a device.

BRIEF DESCRIPTION OF THE DRAWINGS

FIG. 1 is a diagrammatic, perspective view of an optical device stabilized according to the present invention;

FIG. 2 is a partial diagrammatic view in elevation, of a firing simulator incorporating the device according to FIG. 1; and FIG. 3 is a diagrammatic plan view of the arrangement according to FIG. 1.

DETAILED DESCRIPTION OF THE INVENTION

In the optical arrangement according to FIG. 1, a collimated light beam is successively reflected by mirrors respectively incorporated in the intermediate and central mountings of a gyroscope in a cardan suspension. The optical path is set up in such fashion that the beam is projected on each mirror in a direction parallel to the hinge pivot of the mountings of such mirror connecting it with the mounting carrying the light source. Thus, the direction of the beam with reference to the mounting carrying the mirror, and the direction of the reflected beam, remain unchanged whatever the position relatively to the preceding mounting. Consequently, the direction of the reflected beam from the last mirror attached to the central mounting which is gyroscopically stabilized is geometrically linked with that of the mounting in question. This mirror is so arranged that the beam will be parallel to the gyroscope axis; the deflection of the beam with reference to the optical system is consequently exactly the same as that of the gyroscope, and corresponds to the required correction for deviation.

The arrangement shown in FIG. 1 comprises a point source 1 and the lens 2. The axis A of the beam 3 is parallel 2 which provides a bundle or beam 3 of parallel light rays directed at a plane mirror 4 set at 45° with reference to the axis A of the beam 3 and carried on a mobile mounting or carriage 5 pivoting freely on two trunnions 6, 7 on a stirrup 8 attached on frame 20 carrying the light source 1 and the lens 2. The axis A of the beam 3 is parallel with the axis O-Y of the two trunnions 6, 7. A mounting ring 9 on the carriage 5 receives a freely pivoting second carriage 10 similarly equipped with a plane mirror 11 set at 45° to the axis of the beam reflected from the mirror 4. This second mobile mounting or carriage 10 pivots on two trunnions 12, 13 inside the mounting ring 9 forming an axis O-Z parallel with the axis B of the beam reflected by the mirror 4. A gyroscope with its driving means is fitted in one part of the carriage 10. Axis 14 of a gyroscope rotor 15 is oriented on an axis O-X parallel to the axis C of the beam reflected by the mirror 11. The rotor 15 is centered at O, at the meeting point of the three axes O-X, O-Y, and O-Z, and is thus suspended by a cardan system (gimbals) formed by the carriages 10 and 5 from the stirrup 8. A pin 16, in extension of the carriage 10, is coaxial with the rotor 15. It terminates in a ball or button 17. The mobile mountings or carriages 5 and 10 together with all accessory parts, are carefully balanced on their axes of oscillation by the addition of suitable balance weights (not shown). A plunger 18 sliding in a plate 19 forming part of the frame 20 has a conical socket 21 in the extension of the axis O-X opposite the ball 17.

When the plunger 18 is depressed, it holds the ball 17 and thereby the gyroscope mounting, thus enabling the gyroscope to be orientated in the desired, predetermined direction. Once this direction has been set, the operator withdraws the plunger 18, as shown in FIG. 1, out of contact with the ball or button 17, thus freeing the mobile carriage 10 which is now gyrostatically stabilized by the gyroscope in the direction of the axis O-X, i.e., of the predetermined setting of the light beam C, which is itself parallel to the axis O-X.

The plunger 18 can be remotely controlled by a conventional, electromagnetic device with a return spring (not shown). In the disengaged position, (FIG. 1) the sides of the conical socket 21 act as a stop to restrict the oscillations of the frame in normal operation.

The firing simulator shown in FIGS. 2 and 3 incorporates a device according to FIG. 1, and the individual parts thereof are indicated by the same reference numbers. The beam along the axis C, reflected from the mirror 11, impinges on a second mirror 22 set at about 45° to the axis C, and directionally adjustable by a conventional control element 23 for guiding the light spot of a firing simulator. The beam is in this way reflected on to a semireflecting mirror 24 set at 45° to the axis of the reflected beam coming from the mirror 22. The latter is then directed through the lens system of an aiming telescope 25, and the optical axis E thereof is parallel with the axis C.

An observer viewing through the telescope 25 thus sees the light spot emitted by the source 1 by reflection in the mirror 24 superposed on the direct view of the aiming object or target viewed through the transparent part of the mirror 24. At 26, in the prolongation of the axis D of the beam reflected by the mirror 22, a second telescope can be arranged for a firing monitor or conventional recording instrument. At 26, the aiming object is observed by reflection in the mirror 24, and the spot through the transparent part of the same mirror.

In such an arrangement, the marksman follows the light spot in the usual manner, this spot being stabilized by the device shown in FIG. 1 the gyroscope of which is released at the instant of firing (launching). Thus, the original orientation of the spot is maintained, whatever the motions of the simulator. The latter can consequently be mounted without inconvenience on a moving vehicle, or any other, inherently unstabilized carrier.

The invention is of course by no means restricted to the exemplary embodiments described and represented; it is capable of modification in numerous variant forms suggesting themselves to anyone skilled in the art, depending on the intended applications, and without thereby departing from the essential principle of the invention.

I claim:

1. A device for stabilizing a beam of light projected in a predetermined direction onto an optical system of a firing trainer for guided missiles and the like for producing in the optical system a controllable light spot simulating the path of the guided missile, comprising a support, an outer gimbal mounted on the support for pivotal movement about a horizontal axis, an inner gimbal carried by the outer gimbal for pivotal movement about a vertical axis, a gyroscopic rotor mounted in the inner gimbal so that the spin axis of the rotor is parallel to the predetermined direction, a first mirror supported by the outer gimbal, a second mirror supported by the inner gimbal, and means including a light source mounted on the support for projecting a beam of light onto the first mirror in a direction parallel to the horizontal axis, said first mirror having its reflecting surface inclined to the axis of the light beam for reflecting the beam in a direction parallel to the vertical axis, and said second mirror being so positioned in the path of the reflected beam and having its reflecting surface so inclined thereto that the beam is reflected from the second mirror in the predetermined direction.

2. The device as claimed in claim 1, further comprising releasable caging means including a pin and socket conical centering element, one component of which is connected to the inner gimbal and the other component of which is incorporated in a manual control element for allowing an initial orientation of the spin axis of the gyroscopic rotor.

References Cited

UNITED STATES PATENTS

| | | | |
|---|---|---|---|
| 1,982,637 | 12/1934 | Carlson | 74—5.1 |
| 2,105,148 | 1/1938 | Inglis | 74—5.1 |
| 2,609,606 | 9/1952 | Draper et al. | 33—49.3 |
| 2,684,007 | 7/1954 | Newell | 356—248 X |
| 3,266,325 | 8/1966 | Schaffer. | |
| 3,276,273 | 10/1966 | Baker. | |
| 3,319,052 | 5/1967 | Arshall | 235—150.26 |
| 3,335,614 | 8/1967 | Ellis. | |
| 3,424,010 | 1/1969 | Pollack. | |

FOREIGN PATENTS

| | | |
|---|---|---|
| 689,029 | 3/1953 | Great Britain. |
| 1,396,456 | 3/1965 | France. |
| 85,785 | 8/1965 | France. |

RONALD L. WIBERT, Primary Examiner

W. A. SKLAR, Assistant Examiner

U.S. Cl. X.R.

33—46, 49.3; 74—5.1; 350—16